(12) United States Patent
Guma

(10) Patent No.: US 11,529,858 B1
(45) Date of Patent: *Dec. 20, 2022

(54) PORTABLE AUTOMATIC VEHICLE CANOPY

(71) Applicant: Tesfa Guma, Annandale, VA (US)

(72) Inventor: Tesfa Guma, Annandale, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/300,031

(22) Filed: Feb. 19, 2021

Related U.S. Application Data

(63) Continuation-in-part of application No. 15/932,655, filed on Apr. 4, 2018, now Pat. No. 10,981,440.

(60) Provisional application No. 62/601,967, filed on Apr. 6, 2017.

(51) Int. Cl.
    *B60J 11/02*     (2006.01)
    *B60J 11/04*     (2006.01)
    *E06B 9/42*     (2006.01)

(52) U.S. Cl.
    CPC ............... *B60J 11/04* (2013.01); *B60J 11/02* (2013.01); *E06B 9/42* (2013.01)

(58) Field of Classification Search
    CPC .. B60J 11/04; B60J 11/06; B60J 11/08; E06B 9/42
    USPC .......... 296/95.1, 96, 136.01, 136.02, 136.05, 296/136.06; 280/762; 160/370.12; 150/166

See application file for complete search history.

(56) References Cited

U.S. PATENT DOCUMENTS

| | | | | |
|---|---|---|---|---|
| 3,297,356 A * | 1/1967 | Francis | ..................... | B60J 11/08 296/95.1 |
| 3,876,245 A * | 4/1975 | Lowery | ..................... | B60J 11/00 296/95.1 |
| 3,957,301 A * | 5/1976 | Huber | ..................... | B60J 11/00 296/95.1 |
| 4,432,581 A * | 2/1984 | Guma | ..................... | B60J 11/02 135/88.07 |
| 4,848,827 A * | 7/1989 | Ou | ........................... | B60J 11/00 296/99.1 |
| 5,230,545 A * | 7/1993 | Huang | ..................... | B60J 11/00 160/370.21 |
| 5,244,246 A * | 9/1993 | Cunningham | ........... | B60J 11/00 296/136.11 |
| 5,275,460 A * | 1/1994 | Kraus | ..................... | B60J 11/06 150/166 |
| 5,690,376 A * | 11/1997 | Leidal | ..................... | B60J 11/00 296/211 |
| 5,791,361 A * | 8/1998 | Chong | ..................... | B60J 11/00 135/88.01 |
| 5,800,006 A * | 9/1998 | Pettigrew | ................. | B60J 11/00 150/166 |
| 7,431,375 B1 * | 10/2008 | Julius | ..................... | B60J 11/06 150/168 |
| 8,020,917 B1 * | 9/2011 | Senter | ..................... | B62D 33/04 296/136.01 |
| 8,419,107 B2 * | 4/2013 | Manchanda | ............. | B60J 11/06 296/136.1 |
| 9,770,966 B1 * | 9/2017 | Gill | .......................... | B60J 11/04 |
| 2004/0123892 A1 * | 7/2004 | Kim | ........................ | E04H 6/025 135/88.08 |

(Continued)

*Primary Examiner* — Joshua E Rodden
(74) *Attorney, Agent, or Firm* — Neifeld IP Law PLLC

(57) ABSTRACT

The invention provides an improved cover for a vehicle, which includes a frame and a hinge, so that the cover can be unfolded to substantially cover the vehicle and folds back into a storage position.

8 Claims, 6 Drawing Sheets

(56) References Cited

U.S. PATENT DOCUMENTS

| | | | |
|---|---|---|---|
| 2006/0061132 A1* | 3/2006 | Sua-An | B60J 11/00 296/136.01 |
| 2008/0284201 A1* | 11/2008 | Aqeel | B60J 11/00 296/136.01 |
| 2018/0290528 A1* | 10/2018 | Guma | B60J 11/04 |
| 2018/0290529 A1* | 10/2018 | Ching | B60J 11/04 |
| 2018/0345058 A1* | 12/2018 | Walker | A62C 2/10 |
| 2020/0016969 A1* | 1/2020 | Signori | B60J 11/04 |
| 2021/0221207 A1* | 7/2021 | Normil | B60J 11/04 |

* cited by examiner

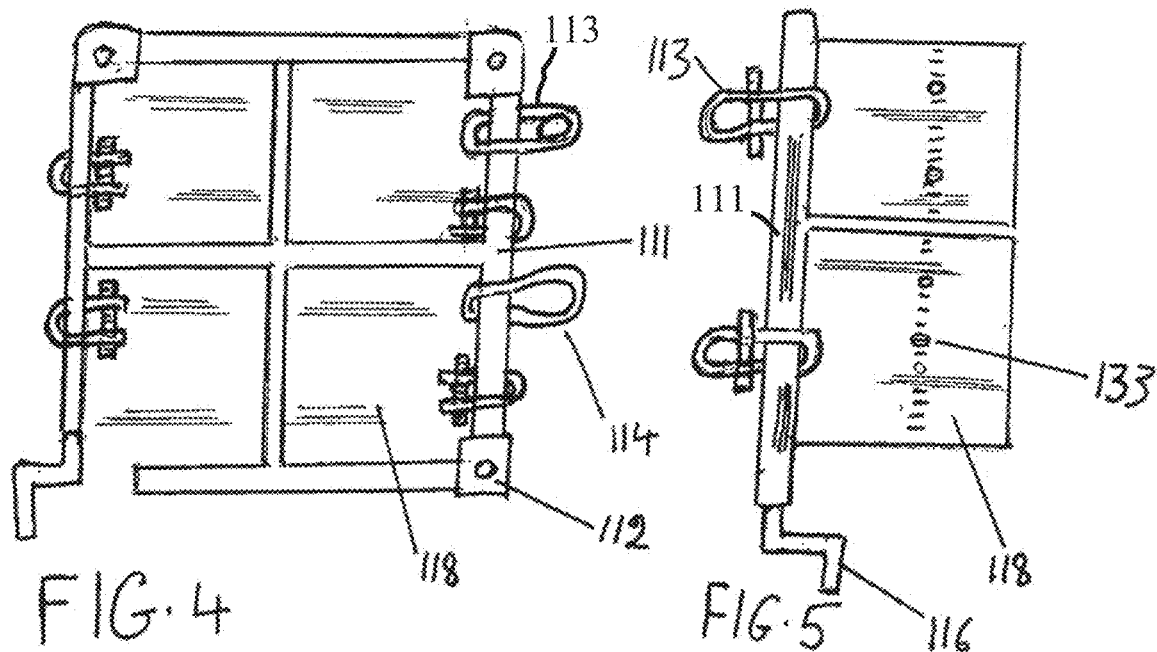
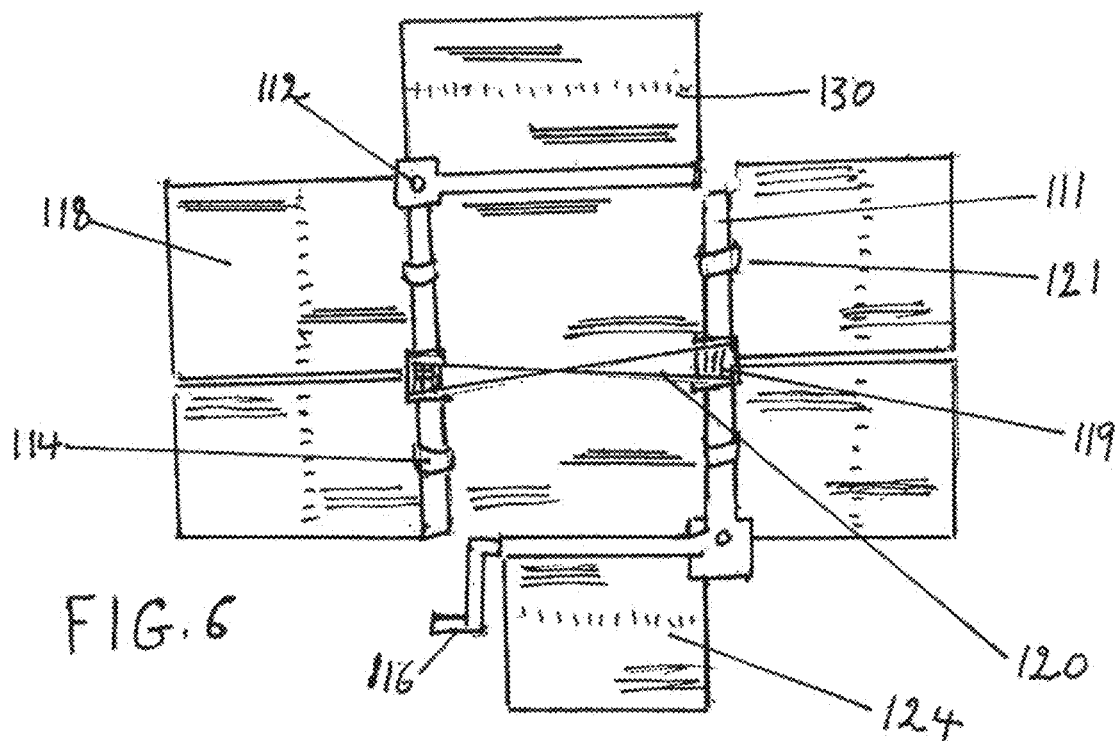

PORTABLE AUTOMATIC VEHICLE CANOPY

CROSS-REFERENCE TO RELATED APPLICATIONS

This application is a Continuation-In-Part of U.S. Pat. No. 5,932,655 filed Apr. 4, 2018, which claims the benefit of U.S. Provisional Application Ser. No. 62/601,967, filed Apr. 6, 2017, and the contents of both of which are herein incorporated by reference in their entirety.

BACKGROUND OF THE INVENTION

Field of the Invention

The present invention relates to covers. More specifically, the present invention relates to those covers which can automatically and effortlessly be unfolded from a storage position to provide protection for vehicles of all kinds and other properties which require protection against the element. It teaches a simple method of protecting a vehicle anywhere, at all times, without the need for expensive covered garage.

BRIEF SUMMARY OF THE INVENTION

The present invention overcomes the problems identified above by providing cover flaps which automatically unfold from a storage position on top of the vehicle and extend out to cover the outside surface of the vehicle such as the side widows, the front and back windshields, and the front and rear hoods of the vehicle and fold back into a storage position when not in deployment. The cover includes elongated plurality of rotatable round frames positioned on the peripheral area of the top of the vehicle similar to roof racks and rails, with cover flaps hinged to the said frames. The hinging, which can also be spring hinge type, is such that it can be loose to allow each cover flap to be manipulated one by one. When the snow or other debris on the cover is too heavy to manipulate all the cover flaps at the same time, the hinging is loosened and the cover flaps are manipulated one by one. Otherwise, the hinges are tightened to the frames to enable automatic manipulation of the whole cover flap system at the same time by turning the rotatable round frames. The manipulation is facilitated by attachment of handles to the frames at only one corner of the vehicle, enabling the owner, especially the handicapped, to cover the property from one position only, thus avoiding the strenuous inconvenience of having to move around the vehicle.

Separate layer of flat cover flaps are provided to cover the roof of the vehicle and hinged to the said frames. To get rid of debris on the roof of the vehicle, these roof covers are lifted and swung open and turned to the side of the vehicle thus dropping off the debris away from the sides of the vehicle. To return the whole cover system into storage position, the process is reversed and the flat roof cover is first folded back to lay on the roof of the vehicle before the cover flaps for the sides and hoods are folded for storage. When the cover flaps are in folded and storage position, they will automatically lay flat one on top of the other. The stored cover flaps are secured in storage position by security bar and latch mechanism which snaps into position, to prevent flailing dangerously especially when the vehicle is in motion.

This arrangement provides numerous advantages. The cover protects the object being covered from direct exposure to the sun's rays. As a result, it reduces the effects of uncomfortably hot temperature to which a vehicle's interior typically rises during the summer, causing child death when left in the searing heat inside the car. Both the interior and exterior of the vehicle can be protected from the damaging effects of the sun, such as scorching, fading, discoloration and wear, resulting in lower maintenance costs, longer car life, enhanced resale value as well as reducing the need to purchase new car. In the same regard, energy is conserved by reducing the need for air conditioning. The finish is protected from hail, rain and mud rain, thus reducing color fading. It also reduces the time, human energy and money normally spent on washing and polishing the vehicle. The effortless and convenient easy manipulation of the cover with the push of a button or a lever while standing at one spot near the vehicle helps the unwell, and the disabled drivers to protect and enjoy the comfort of their automobile. The owner does not need to build expensive car garage next to his residence. The new invention protects the car so protectively covered, to be parked anywhere, at any time, without the need for expensive covered garage.

BRIEF DESCRIPTION OF THE DRAWING

These and other objects and advantages of the present invention will become more apparent and more readily appreciated from the following detailed description of the presently preferred exemplary embodiment of the invention taken in conjunction with the accompanying drawing, of which:

FIG. 4 is an assembly of round rotatable frames as connected and engaged at three corners by means of angle gear system fitted with only one manipulation handle, and cover flaps hinged to the frames.

FIG. 5 is a sample of assembly of cover flaps as hinged onto a rotatable round frame which is further fitted with the brackets for installation onto vehicle roof rack.

FIG. 6 is another view of FIG. 4 above further fitted with endless cross chains and gearing sprockets installed so as to engage opposite round frames; add cover flaps unfolded and installed on the round rotatable frames.

DETAILED DESCRIPTION OF THE PRESENTLY PREFERRED EMBODIMENT

Figure 1:
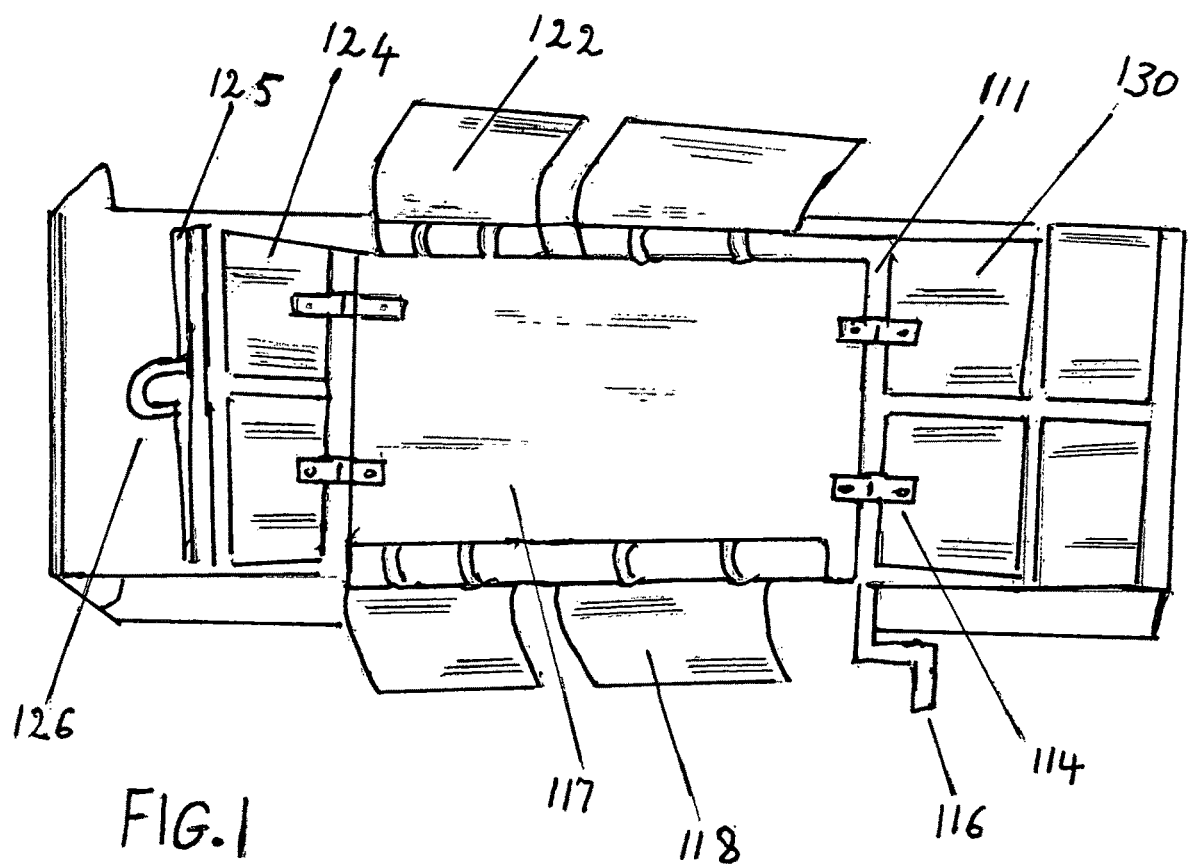
FIG. 1 is a perspective view of the exemplary embodiment of this invention showing a cover system as assembled, installed and deployed on a vehicle.
Figure 2:
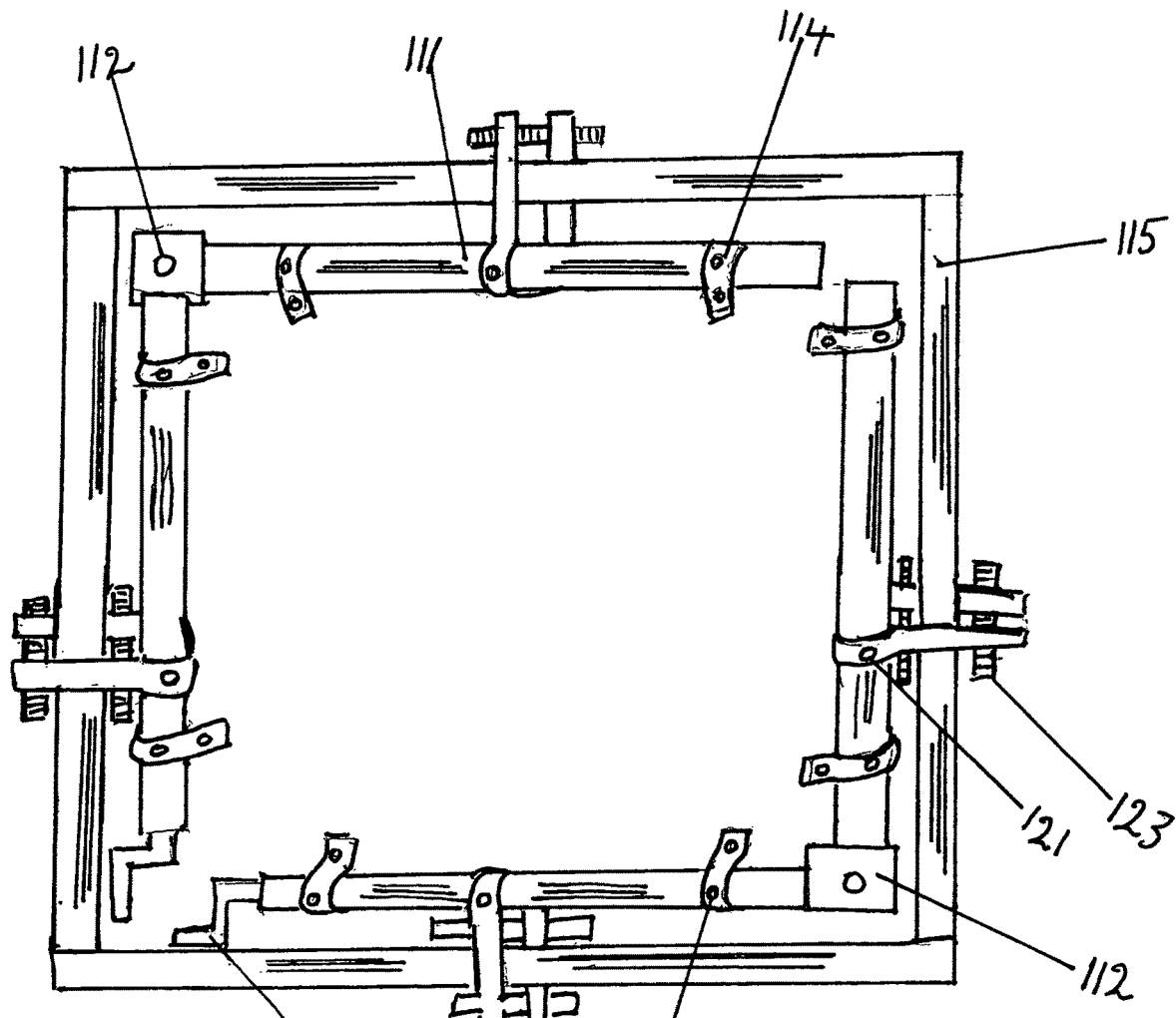
FIG. 2 is an exploded plan view of the assembly of this invention with elongated rotatable round frames engaged at two ends with power transmission angle gearing system which cranking handles, as installed on the roof rack frames of a vehicle.

As illustrated in FIGS. 1 and 2, plurality of elongated rotatable round frames 111 are positioned so as to form a generally rectangular shape on a flat surface such as the 117 roof of a vehicle. The rotatable round frames are engaged at corners with angle gears 112. Alternatively, engaging the ends only at opposite corners is easier and preferred. The gearing system makes the turning of the adjoined rotatable round frames to turn simultaneously when manually forced to turn by means of handles 116.

As illustrated in FIG. 6, it is possible to achieve the same objective of simultaneously turning the frames by installing 119 on the rotatable frames 111 and engaging the sprockets with endless cross chains 120. This arrangement enables the frames to turn in opposite directions when manipulated to do so.

As illustrated in FIGS. 5 and 6, cover flaps 118 are disposed each with one side edge adjacent to the elongated rotatable frames 111.

As best illustrated in FIGS. 1-4 and 6 the said rotatable frames 111 are fitted with hinging means 114 which are used to hinge cover flaps 118 for side windows, cover flap 124 for front windshield and cover flap 130 for rear windshield, to the said elongated rotatable round frames. The said hinging means are made to tighten and loosen as necessary, by screw means 127. When the screws are tight, it enables the cover visor flaps to turn along with the rotatable round frames. When the frames are forced to turn, the arrangement enables the cover system to cover or uncover the windows and windshields of the vehicle. The loosening of the screws 127 makes it possible to turn the visors only, one by one, especially when the debris on the flaps is too heavy to turn the flaps all together.

Figure 3:
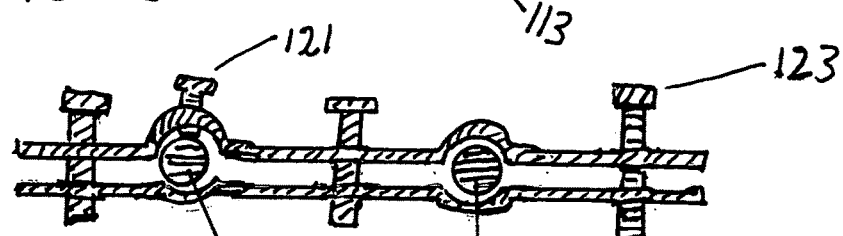
FIG. 3 is a side end view of assembly of a bracket system to be deployed when installing the cover system onto vehicle roof rack.

As best illustrated in FIGS. 2-4, bracket 113 is deployed to install rotatable frames 111 and the cover system to vehicle roof rack 115 by means of bracket bolts 123.

As illustrated in FIGS. 2, 3, frame rotation control screw 127 is deployed to control rotation of the frames 111. It is to tighten or loosen the fastening between installation bracket 113 and frames 111. When the frame rotation control screw is loose it allows the frames to turn, and along with it, the turning of the cover flaps. When the control screw is tightened it impedes the turning of the frames and along with it, the turning of the cover flaps. To manipulate the cover flaps one by one, it is necessary to loosen the screw 127 of the cover flap. This latter alternative step for manipulation of the cover flap is necessary when the debris on the visor flaps is too heavy, requiring the turning of the cover flaps one by one; a helpful strategy for those who do not have the necessary energy.

Rotation control bolt 121 is also disposed on installation bracket 113 to control the rotation of the rotatable frame.

Figure 8:
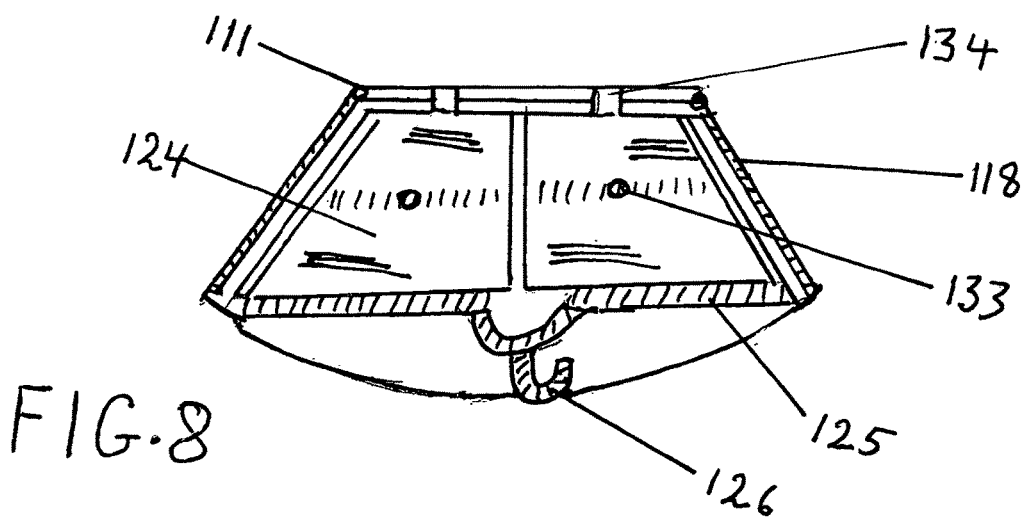
FIG. 8 is a plan view of the present invention showing the cover flap for the front wind shield, the front end views of the side window covers and cover retention bar and latch system.
Figure 9:
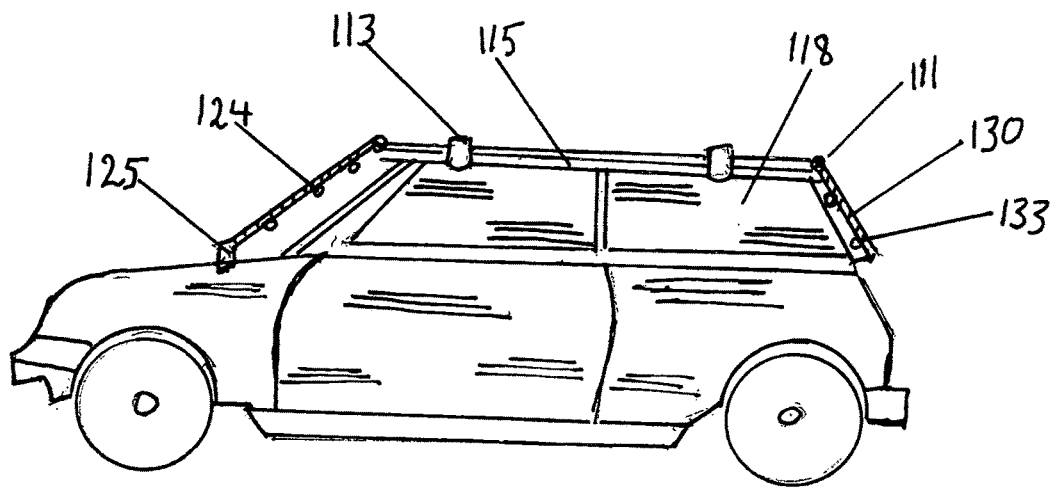
FIG. 9 is a side-view of a vehicle showing the cover flaps covering one side window and end views of the cover flaps for the front and rear wind shields.

As best illustrated in FIGS. 6, 8, and 9, front windshield 124 is fitted with retainer bar 125 which is configured to accommodate security latch 128. The combination of both the latch and the retainer bar is designed to securely hold the front windshield cover in place both during deployment and when in storage positions.

As best illustrated in FIGS. 3 and 4, installation bracket 113 is deployed to install the assembly of the cover system on the vehicle roof rack 115 by means of bracket bolt 123. The installation bracket is designed to adapt onto different sizes of roof racks. Alternatively, the assembly of frames 111 can first be installed on the roof rack by means of bracket 113 and bolt 123; and then the cover flaps 118, 124 and 130 can by hinged onto respective round rod frames 111.

Figure 7:
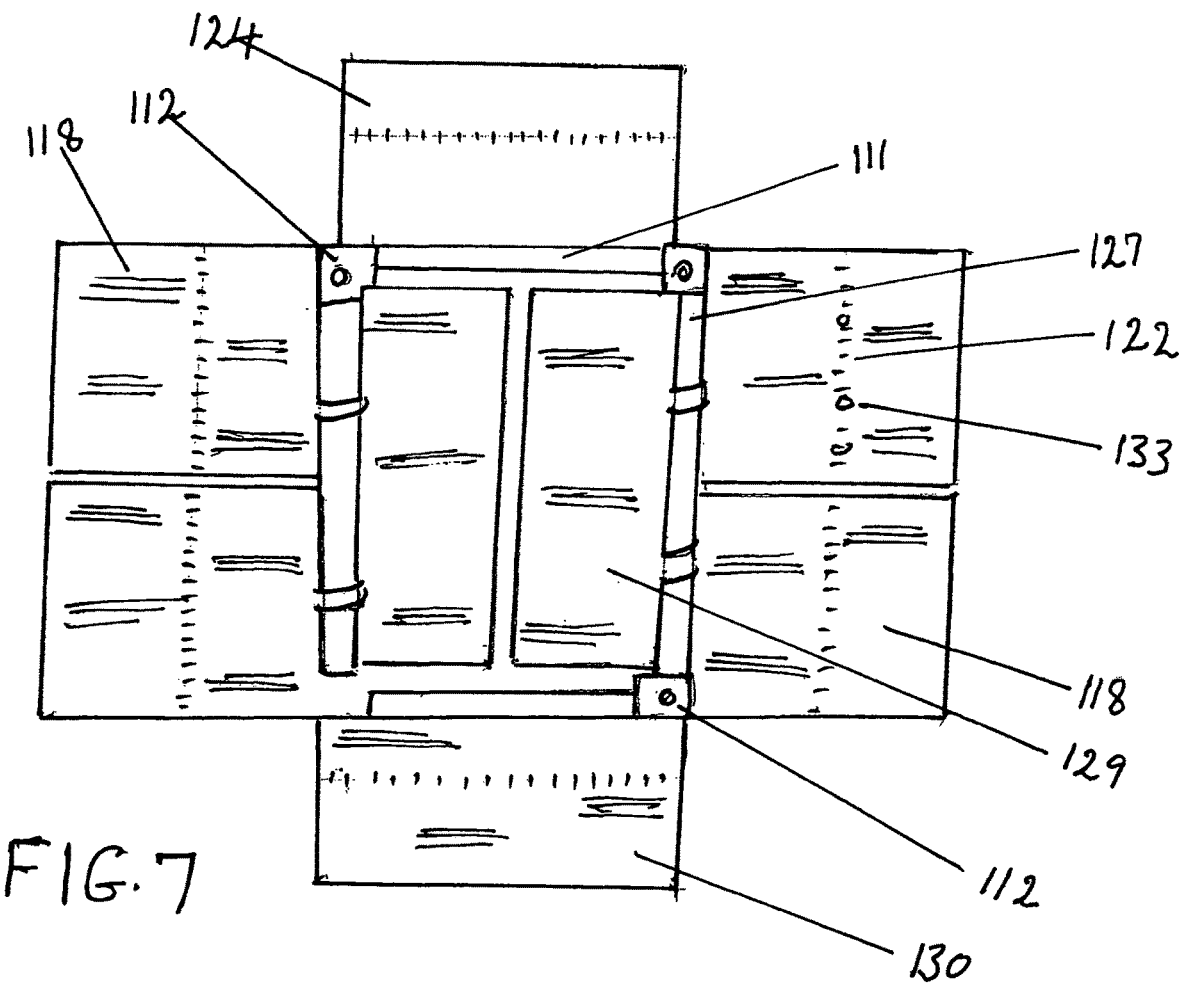
FIG. 7 is a plan view of a complete assembly of the cover system, with extension and folding hinges, including cover flaps for side windows, front and rear wind shields and cover for the roof of a vehicle.

As best illustrated in FIG. 7, cover flaps 118 are fitted with extension and folding hinges 122. The hinges are to increase and extend the size of the flaps to cover more surface. The hinges also facilitate easy folding into compact size when the flaps are to be returned into storage form.

Roof cover flaps 129 are disposed and hinged to round rod frame 111. This additional component is to supplement the function of full protective coverage for the vehicle. It is loosely hinged to the round rod frame 111 for easy unfolding one by one to throw off the debris to the side of the vehicle and returned to its permanent flat position to cover the roof of the vehicle. All the hinging mechanism indicated above can be of spring hinging type. Spacers 133 can be disposed on all cover flaps on the surface which touches the vehicle surface to maintain air space so that the covers do not scratch the vehicle surface.

As best illustrated in FIG. 8, front windshield cover 124 is disposed in place and hinged by hinges 134 to rotatable round frame 111. It is fitted with cover retention security bar 125 which is configured to accommodate security latch hook 126.

As illustrated in FIG. 9, the cover system is shown as deployed to cover one side window, front windshield and rear windshield.

Figure 10:
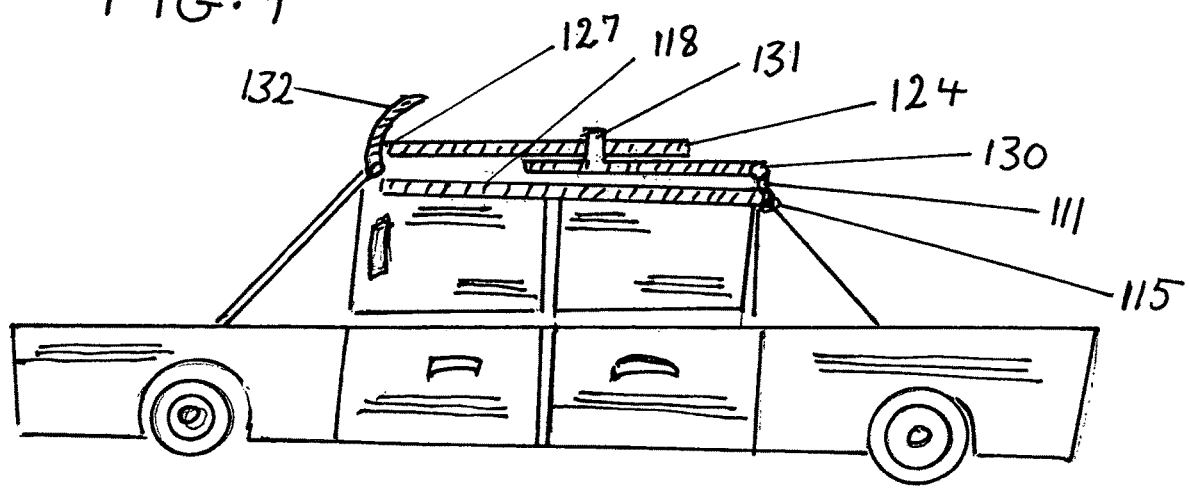
FIG. 10 is a side end view of the cover flaps folded up into a storage position on top of a vehicle.
Figure 11:
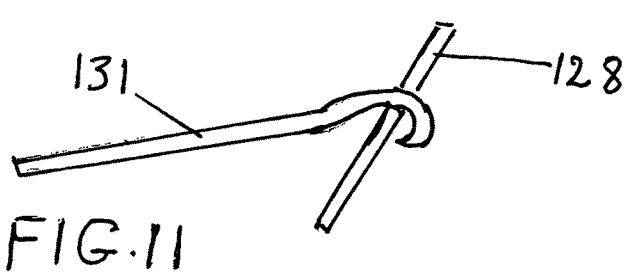
FIG. 11 is a plan view of an exemplary security retention latch system for the cover flaps of the presently preferred embodiment of this invention.

As best illustrated in FIG. 10, the cover system with flaps for all mentioned surfaces is shown in storage position on top of a vehicle depicting the proper sequential manipulation steps. Wind break 132 is also provided to supplement security of folded front windshield against flailing especially when the vehicle is motion.

As illustrated in FIGS. 1, 8 and 111, exemplary security system is shown with security latch hook 131 disposed in engaged position with the security bar 125 of front windshield cover 124.

Figure 12:
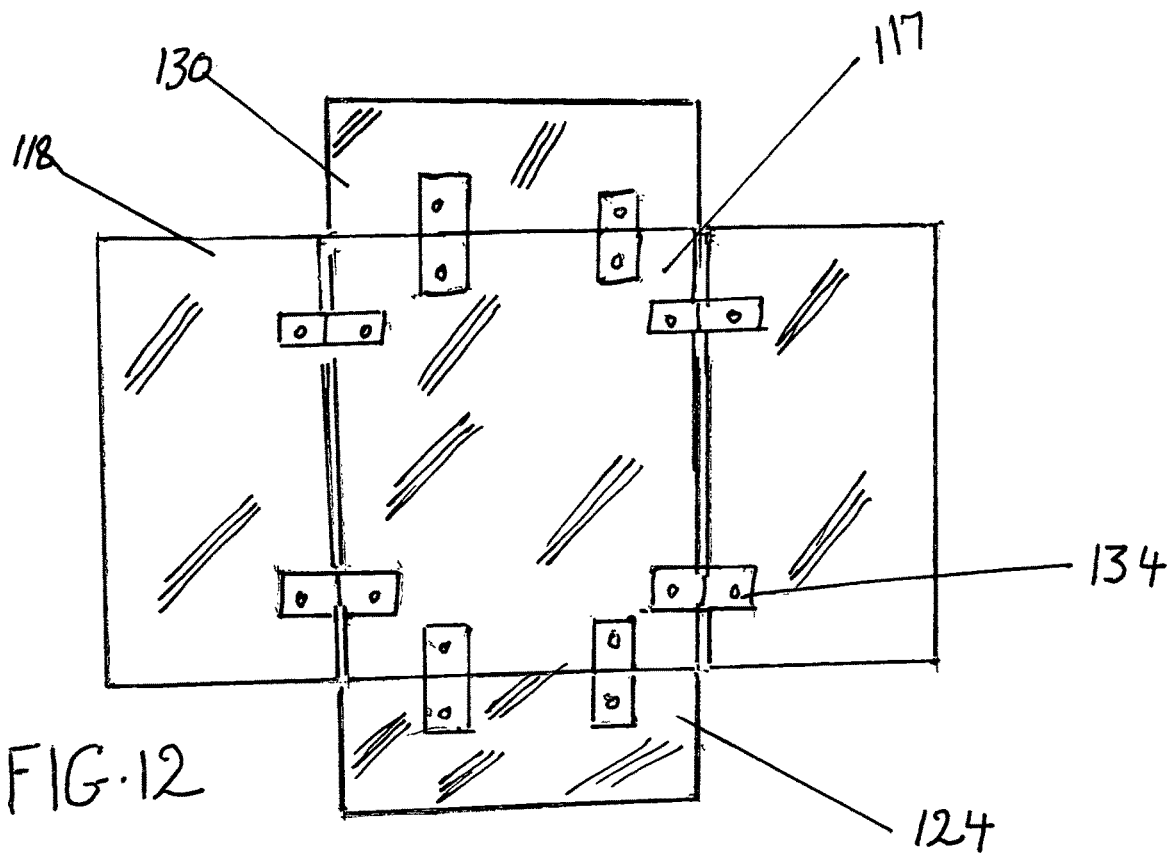
FIG. 12 is a plan view of cover sheets in unfolded position, hinged directly to the surface of a car.

As best illustrated in FIG. 12, as an additional method, cover sheets 118, 124 and 130 are hinged directly to the surface to be covered by means of spring loaded hinges 134. This version of the cover system allows the vehicle operator to manipulate the cover sheets one by one by hand. It is more convenient and easy for installation while performing the same operation of covering the vehicle.

Figure 13:
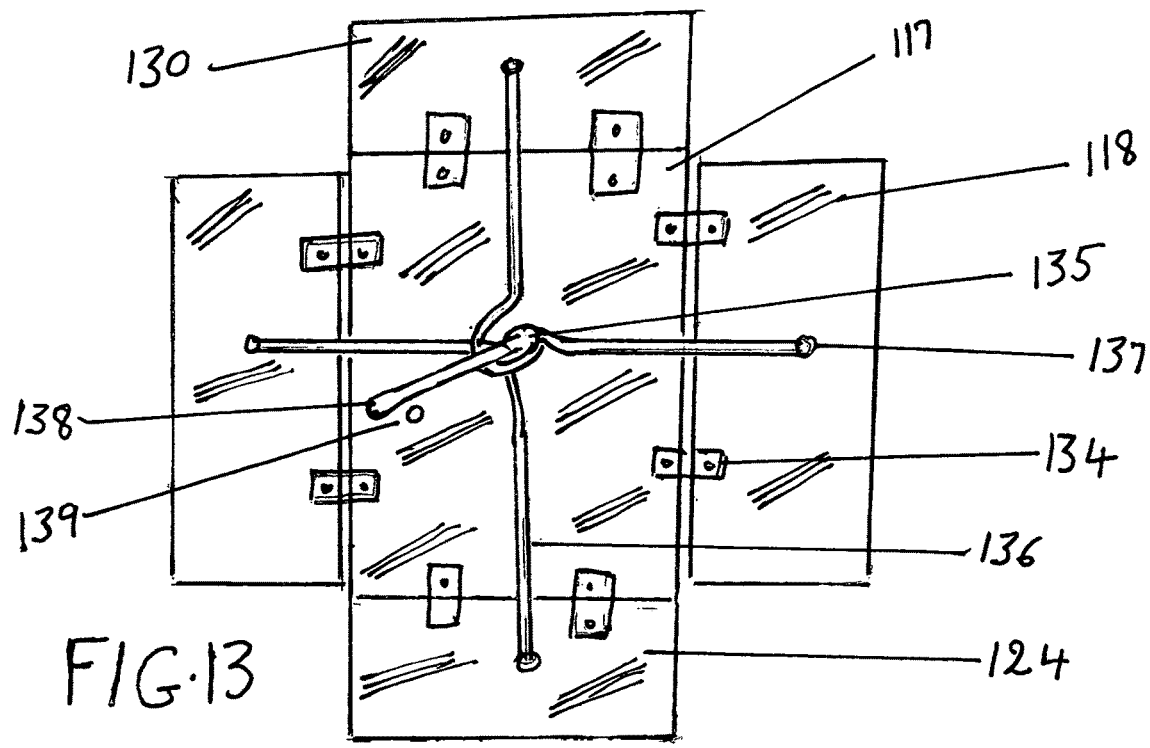
FIG. 13 is a plan view of the cover sheets in a deployed position, showing automatic manipulation mechanism by means of a reeling pulley by means of pulling cables and spring loaded hinges.

As best illustrated in FIG. 13, Cover sheets 118, 124 and 130 are disposed in deployed position and hinged to a vehicle roof surface 117 by means of spring loaded hinges 134. The spring loading is biased outwardly so as to force the cover sheets to spread out and remain in covering position. Reeling spool 135 is disposed and fastened to the roof surface. Cables 136 connect the reeling spool to anchor 137 on the cover sheets. Reeling spool 135 is fitted with spool crank handle 138 to facilitate easy turning of the reeling spool counter clock wise. In this particular example, when the crank handle is turned counter clockwise it pulls and draws on the cables tight and winds them on the reel, thus pulling the cover sheets inward to uncover the surface. Once the surface is fully uncovered, the cover sheets lay flat on the vehicle roof and the crank handle is securely held in position by means of spool crank handle anchor 139. To cover the surfaces again, the crank handle is released from the anchor and the spring loaded hinges pull on the cover sheets and force them back to return to the covering position.

The process of deployment of portable automatic vehicle canopy as detailed above has to follow pre-set sequence during manipulation. The process is to ensure proper function while in deployment and secure storage against dangerous flailing while in storage position, especially during the movement of the vehicle.

First, to deploy for coverage, the security latch is disengaged; Second, the cover section for the front windshield is unfolded from storage position toward covering the said surface; Third, the cover for the rear windshield is unfolded and extended out to cover the rear windshield. Fourth, the covers for side windows are unfolded and extended out to cover the side windows.

This along with the above described embodiment of this presently preferred invention completes and meets all the objectives and benefits of this invention by providing complete protective cover for a vehicle, making it deployable at all times, and in all places.

Although only a few exemplary embodiments of this invention have been described in detail above, those skilled in the art would readily appreciate that many modifications are possible in the exemplary embodiments without materially departing from the novel teachings and advantages of this invention.

Accordingly, all such modifications are intended to be included within the scope of this application as defined in the following claims.

What is claimed is:

1. A cover for a vehicle, said vehicle having a vehicle passenger compartment and a vehicle outer surface, said vehicle outer surface comprising a first side surface, a second side surface, a front windshield surface, a rear windshield surface, a front hood surface, a rear hood surface, and a roof surface; said cover comprising:
   a plurality of rotatable frames;
   a plurality of installation brackets, wherein each one of said plurality of installation brackets has an installation bracket first end and an installation bracket second end;
   wherein each installation bracket first end is configured to be fastened to said vehicle;
   wherein each installation bracket second end is configured to hold one of said plurality of rotatable frames;
   at least one installation-bracket-to-rotatable-frame rotation controller for selectively allowing and preventing rotation of a respective one of said rotatable frames held by a respective one of said installation brackets, relative to said one of said installation brackets;
   wherein said installation-bracket-rotatable-frame rotation controller is disposed on said respective one of said plurality of installation brackets;
   a plurality of cover sheets;
   a plurality of cover sheet hinges;
   wherein each one of said plurality of cover sheet hinges has a cover sheet hinge first end fastened to a corresponding one of said plurality of cover sheets, so that, when said cover sheet hinge first end rotates, said corresponding one of said cover sheets fastened thereto also rotates;
   wherein each one of said plurality of cover sheet hinges has a cover sheet hinge second end holding a corresponding one of said plurality of rotatable frames;
   at least one cover-sheet-hinge-to-rotatable-frame rotation controller for selectively allowing and preventing rotation of a respective one of said cover sheet hinges holding a respective one of said plurality of rotatable frames, relative to said respective one of said rotatable frames;
   wherein said cover-sheet-hinge-to-rotatable-frame rotation controller is disposed on said respective one of said plurality of cover sheet hinges;
   a roof cover sheet;
   wherein said roof cover is configured to be hinged either to said roof surface or to one of said plurality of rotatable frames;
   a plurality of spacers disposed on said plurality of cover sheets, for spacing said cover sheets from said vehicle outer surface; and
   a wind break configured to be disposed across the top area of said front windshield surface; and
   a telescoping structure for adjusting the length of at least one of said plurality of rotatable frames, so that respective ones of said plurality of rotatable frames can have their size adjusted to conform with the size of the vehicle.

2. The cover of claim 1, further comprising:
   a plurality of gears;
   wherein said plurality of gears are installed on said plurality of rotatable frames;
   a plurality of drive belts;
   wherein said plurality of drive belts are disposed on said plurality of gears;
   wherein said plurality of drive belts are configured to engage with said plurality of gears; and
   wherein said plurality of drive belts force respective ones of said plurality of said plurality of rotatable frames to rotate simultaneously in opposite directions, to thereby result in said plurality of rotatable frames either covering or uncovering said vehicle surface.

3. The cover of claim 1, further comprising: a crank handle configured to provide rotational force to a one of said plurality of rotatable frames when force is applied to rotate said crank handle.

4. The cover of claim 1, further comprising: a second roof cover sheet which is rotatable to selectively cover and uncover a portion of said roof surface.

5. The cover of claim 1, further comprising 1 plurality of retainer devices for each retaining a respective one of said plurality of cover sheets in either a deployed or a stored configuration, and to hold retain in place said plurality of cover sheets against removal and flailing.

6. The cover of claim 1, further comprising: a plurality of said cover-sheet-hinge-to-rotatable-frame rotation controllers, each of which is for selectively allowing and preventing rotation of a respective one of said cover sheet hinges holding a corresponding one of said plurality of rotatable frames, relative to said respective one of said cover hinges.

7. The cover of claim 1, further comprising: a hinging device for unfolding of said plurality of cover sheets during deployment to cover said vehicle surface, and for folding said plurality of cover sheets to return them to a storage position.

8. The cover of claim 1, further comprising: secure lock to hold said plurality of cover sheets in place against removal.

* * * * *